United States Patent Office 3,271,310
Patented Sept. 6, 1966

3,271,310
METAL SALTS OF ALKENYL SUCCINIC ACID
William M. Le Suer, Cleveland, Ohio, assignor to The Lubrizol Corporation, Wickliffe, Ohio, a corporation of Ohio
No Drawing. Filed Sept. 8, 1964, Ser. No. 395,031
7 Claims. (Cl. 252—35)

This invention relates to new chemical compositions and to hydrocarbon compositions containing the same. More particularly, the invention relates to a novel class of chemical compositions useful as detergents and rust inhibitors. Still more particularly, this invention relates to metal salts of hydrocarbon-substituted succinic acids.

The prior are has taught the need for efficient rust inhibitors in lubricating oils. The need is especially prevalent in engines which are infrequently operated, and particularly in engines which are subject to extended storage in humid climates. These engines experience excessive rusting of cylinder walls, wrist pins and other polished working surfaces. Such rusting can be explained by the fact that moisture accumulates within the engine, penetrates the lubricating film, and attacks ferrous surfaces; the attack is also aggravated by residues of chlorine and bromine compounds left from the combustion of gasolines containing tetraethyl lead.

Also, the prior art has taught the need for better detergents. Detergents impart properties to the lubricating oils which enable them to keep oil oxidation products, i.e., fuel soots and resins, and other types of insoluble materials, in suspension or dispersion in the oils so that they will not settle out or adhere to metal surfaces and build up sludge or varnish deposits. Detergents are especially useful in the lubrication of engines run at high temperatures and under severe service, e.g., diesel engines where the detergent acts to keep blow-by fuel soots and fuel resins in dispersion in the oil so that these oil-soluble contaminants will not deposit out and cause excessive piston varnish, ring sticking, and sludge.

Increased demand in the lubricant additive field for better and more efficient, heavy-duty lubricants has prompted the development of additives which exhibit dual purposes, e.g., additives which act as rust inhibitors and detergents. It has been found that such a dual purpose additive is available as a product of this invention.

Also, it has been found that the products of this invention are good emulsifying agents when used in water-in-oil emulsions.

It is, therefore, an object of this invention to provide novel compositions of matter.

It is also an object of this invention to provide compositions which are adapted for use as additives in hydrocarbon oils.

It is also an object of this invention to provide compositions which are useful as detergents and rust inhibitors in hydrocarbon oils.

It is also an object of this invention to provide improved lubricating compositions.

Still further, it is an object of this invention to provide compositions useful as emulsifying agents in water-in-oil emulsions.

These and other objects of this invention are accomplished by providing a metal salt of a hydrocarbon-substituted succinic acid having at least about 50 aliphatic carbon atoms in the hydrocarbon substituent, the metal of said metal salt being selected from the class consisting of Group I metals, Group II metals, aluminum, lead, tin, cobalt, and nickel.

The hydrocarbon-substituted succinic compounds of the metal salt compositions are readily obtainable from the reaction of maleic anhydride or maleic acid and a high molecular weight olefin or a chlorinated hydrocarbon or other high molecular weight hydrocarbon containing an activating polar substituent, i.e., a substituent which is capable of activating the hydrocarbon molecule with respect to the reaction with maleic anhydride or the acid thereof. Said reaction involves heating equivalent portions of the maleic anhydride and hydrocarbon, for example, at a temperature within the range of from about 100° C. to about 200° C. The resulting product is a hydrocarbon-substituted succinic anhydride. The succinic anhydride may be hydrolyzed to the corresponding acid by treatment with water or steam. The hydrocarbon-substituted succinic acid is preferred for the purposes of this invention.

The principal sources of the hydrocarbon-substituted radical include the high molecular weight petroleum fractions and olefin polymers, particularly polymers of mono-olefins having from 2 to about 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefines, i.e., olefins in which the olefinic linkage is not at the terminal position, are likewise useful. Such medial olefins, i.e., olefins in which the olefinic linkage by 2-butene, 3-pentene, and 4-octene, etc.

Also useful are the interpolymers of the olefins such as those illustrated above with other interpolymerizable olefinic substances such as aromatic olefins, cyclic olefins, and poly-olefins. Such interpolymers include, for example, those prepared by polymerizing isobutene with styrene, isobutene with butadiene, propene with isoprene, ethylene with piperylene, isobutene with chloroprene, isobutene with p-methyl styrene, 1-hexene with 1,3-hexadiene, 1-octene with 1-hexene, 1-heptene with 1-pentane, 3-methyl-1-butene with 1-octene, 3,3-dimethyl-1-pentane with 1-hexene, isobutene with styrene and piperylene, etc.

The relative proportions of the mono-olefins to the other monomers in the interpolymers influence the stability and oil-solubility of the products of this invention. Thus, for reasons of oil-solubility and stability, the interpolymers contemplated for use in this invention should be substantially aliphatic and substantially saturated, i.e., they should contain at least about 80%, and preferably at least about 95%, on a weight basis, of units derived from the aliphatic mono-olefins and no more than about 5% of olefinic linkages based on the total number of carbon-to-carbon covalent linkages. In most instances, the percent of olefinic linkages should be less than about 2% of the total number of carbon-to-carbon covalent linkages.

Specific examples of such interpolymers useful in this invention include the following (percent by weight): copolymer of 95% of isobutene with 5% of styrene, terpolymer of 98% of isobutene with 1% of piperylene and 1% of chloroprene, terpolymer of 95% of isobutene with 2% of 1-butene and 3% of 1-hexene, terpolymer of 60% of isobutene with 20% of 1-pentene and 20% of 1-octene, copolymer of 80% of 1-hexene and 20% of 1-heptene, terpolymer of 90% of isobutene with 2% of cyclohexene and 8% of propene, and copolymer of 80% of ethylene and 20% of propene.

Another source of the hydrocarbon substituent radicals includes saturated aliphatic hydrocarbons derived from highly refined high molecular weight white oils or synthetic alkanes such as are obtained by hydrogenation of the high molecular weight olefin polymers illustrated above or high molecular weight olefinic substances.

In addition to the pure hydrocarbon substituents described above, it is intended that the term "hydrocarbon substituent," as used in the specification and claims, include substantially hydrocarbon substituents. For example, the hydrocarbon substituent may contain polar substituents provided, however, that the polar substituents are not present in proportions sufficiently large as to alter significantly the hydrocarbon character of the radical. The polar substituents contemplated are those exemplified by chloro, bromo, keto, aldehydo, ethereal, and nitro, etc. The upper limit with respect to the proportion of such polar substituents in the radical is approximately 10% based on the weight of the hydrocarbon portion of the radical.

Another important aspect of this invention is that the hydrocarbon substituent of the hydrocarbon-substituted succinic compound should be substantially saturated, i.e., at least about 95 percent of the total number of carbon-to-carbon covalent linkages are saturated linkages. An excessive proportion of unsaturated linkages renders the molecule susceptible to oxidation, deterioration, and polymerization and results in products unsuitable for use in hydrocarbon oils in many applications.

The size of the hydrocarbon substituent of the said succinic compound appears to determine the effectiveness of the additive of this invention as a detergent in lubricating oils. It is critically important that said substituent be large, that is, that it have at least about 50 aliphatic carbon atoms in its structure. The molecular weight of the hydrocarbon substitutent should be within the range of from about 700 to about 100,000. Olefin polymers having a molecular weight of from about 750 to 5,000 are preferred. However, higher molecular weight olefin polymers having molecular weights from about 10,000 to about 100,000 are also useful and have been found to impart viscosity index improving properties to the metal salt compositions of this invention. In many instances, the use of such higher molecular weight olefin polymers is desirable.

The most common sources of these substantially aliphatic hydrocarbon substitutents are the polyolefins such as polyethylene, polypropylene, polyisobutene, etc. A particularly preferred polyolefin is polyisobutene having a molecular weight of about 1,000.

The hydrocarbon-substituted succinic acids and anhydrides are esecially preferred for use as the acid-producing reactant in this process because of the particular effectiveness of the products obtained from such compounds as additives in hydrocarbon oils.

As indicated earlier, in lieu of the high molecular weight olefin polymers or chlorinated hydrocarbons, other high molecular weight hydrocarbons containing an activating polar substitutent, i.e., a substituent which is capable of activating the hydrocarbon molecule in respect to reaction with maleic acid or anhydride, may be used in the above reaction for preparing the succinic compounds. Such polar substitutents are illustrated by the sulfido, disulfido, nitro, mercapto, bromo, keto, and aldehydo radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range of from about 100° C. to about 200° C.

Also, the acidic reactant of this invention can be a mixture of the above-described hydrocarbon-substituted succinic compounds and phosphorus acids. Such phosphorus acids are acids conforming to the structures

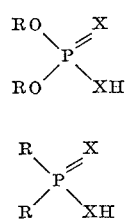

and wherein X is selected from the group consisting of oxygen and sulfur and R is an organic radical containing from about 3 to about 30 carbon atoms and is selected from the group consisting of alkyl, aryl, alkaryl, aralkyl and cycloalkyl radicals. It is contemplated that these organic radicals may also contain polar substituents such as the chloro, bromo, and nitro. Specific examples of the R radicals include isopropyl, isobutyl, n-butyl, sec-butyl, n-hexyl, heptyl, 2-ethylhexyl, diisobutyl, iso-octyl, decyl, dodecyl, tetradecyl, hexadecyl, octadecyl, butylphenyl, o,p-di-pentylphenyl, octylphenyl, polyisobutene (molecular weight of 350)-substituted phenyl, tetra-propylene-substituted phenyl, alpha-octyl-butyl-naphthyl, cyclopentyl, cyclohexyl, phenyl, chlorophenyl, bromophenyl, naphthenyl, 2-methylcyclohexyl, benzyl, chlorobenzyl, chloropentyl, dichlorophenyl, nitrophenyl, dichlorodecyl, and xenyl radicals. The alkyl and aryl radicals having from about 3 to about 30 carbon atoms are preferred.

Phosphinodithioic acids can be prepared by the reaction of Grignard reagents (e.g., butylmagnesium bromide, cyclohexylmagnesium iodide) with phosphorus pentasulfide (see Organophosphorus Compounds, G. M. Kosolapoff, p. 135, John Wiley and Sons, New York, 1960). The diaromatic phosphinodithioic acids can also be prepared by reacting, in the presence of a Friedel-Crafts catalyst, an aromatic compound (e.g., benzene, xylene, and chlorobenzene) with a phosphorus sulfide. The latter reaction can be illustrated by mixing, at about 150° C. to about 180° C., and in the presence of aluminum trichloride, four moles of chlorobenzene and one mole of phosphorus pentasulfide. As the reaction takes place, hydrogen sulfide is emitted.

The preparation of alkyl aryl phosphinodithioic acids is illustrated by the reaction of an alkyl thionophosphine sulfide (e.g., $(RPS_2)_2$) with an aromatic compound in the presence of aluminum chloride as described by Newallis et al., in vol. 27, Journal of Organic Chemistry, page 3829. For example, phenyl methyl phosphinodithioic acid is easily prepared by the reaction of methyl thionophosphine sulfide with benzene in the presence of aluminum chloride.

The phosphorodithioic acids are readily obtainable from the reaction of phosphorus pentasulfide and an alcohol or phenol. The reaction involves mixing, at a temperature within the range of from about 20° C. to about 200° C., 4 moles of the alcohol or phenol per mole of phosphorus pentasulfide. Hydrogen sulfide is liberated as the reaction takes place.

The phosphinodithioic acids and phosphorodithioic acids can be converted to the phosphinic acids and phosphoric acids by treating the dithioic acids with water or steam which, in effect, replaced the sulfur atoms with oxygen atoms. Either one or both of the sulfur atoms can be replaced. The phosphorodithioic acid or phosphinodithioic acid is preferred for rust inhibitors while the phosphoric acid or phosphinic acid is preferred when used as detergents.

When the acidic reactant is a mixture of (A) a hydrocarbon-substituted succinic compound and (B) a phosphorus acid, it is preferred that the proportions of (A) to (B) in said mixture conform to the proportions of 0.2 to 1.8 equivalents to 1.9 to 0.1 equivalents. The perferred mixture of the above two acidic compounds is one equivalent of the hydrocarbon-substituted succinic compound to one equivalent of the phosphorus acid compound.

The metal salts which are useful in this invention include those salts containing metals selected from the class consisting of Group I metals, Group II metals, aluminum, lead, tin, cobalt, and nickel. Examples of metal reactants include the following: lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. This invention is not to be considered as limited to the use of the above metal compounds, they are presented merely to illustrate the metal compounds included within the invention.

The salts of this invention are classified as acidic salts, neutral salts and basic salts.

By "acidic salt," is meant a succinic acid in which one of the two carboxylic acid groups is converted to a salt. Thus, an acidic salt contains one free carboxylic acid group and one metal carboxylate group in its molecular structure. Such a salt is illustrated by the formula

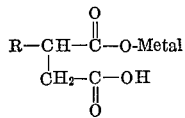

A divalent metal salt can of course result from the neutralization of two moles of the succinic acid per mole of a divalent metal compound.

The term "neutral salt" means a succinic acid in which both carboxylic acid groups are converted to salt groups. Such a salt is illustrated by the formula

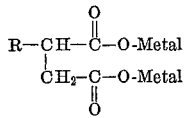

It is obvious that a netural salt of a divalent metal could have the formula

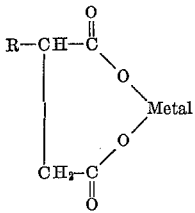

or could conform to a polymer type salt in which the succinic radicals are linked by the divalent metal. Such a neutral salt can be prepared from the reaction of one equivalent of the succinic acid and one equivalent of the metal compound.

In some instances, more than the stoichiometric amount of metal may be incorporated into a succinic acid to form a basic salt. A "basic salt," therefore, is a metal salt in which the metal is present in stoichiometrically greater amounts than the organic acid radical. Such basic salts are characterized by a metal ratio greater than 1. The term "metal ratio" as used herein is the ratio of the total equivalents of metal in the salt to the equivalents of organic acid anion therein. Thus, it is a measure of the stoichiometric excess of metal in a metal salt of an organic acid. For example, a basic salt can be obtained by the reaction of one equivalent of a succinic acid and two equivalents of a metal compound; such a salt would have a metal ratio of 2.

The above definitions of "acidic salt," "neutral salt," and "basic salt" are limited to salts of succinic acids for the sole purpose of simplicity in illustrating the definition. It is recognized that the above definition of salts can apply to mixtures of succinic acids and phosphorus acids.

In preparing basic metal salts, it is sometimes advantageous to treat the reaction mixture, in the presence of a promoter, with carbon dioxide at a temperature within the range of from about 20° C. to the reflux temperature of the mixture. This carbonation step is known in prior art. Such promoters include lower alcohols, e.g., methanol and propanol, and phenolic compounds, e.g., heptylphenol octyl phenol, etc. For example, a basic barium salt having a metal ratio of 6 can be prepared by reacting one equivalent of a succinic acid with at least 6 equivalents of barium oxide and carbonating the mixture in the presence of heptylphenol. The carbonation step is not absolutely necessary in preparing basic salts but it is beneficial in that it allows the incorporation of significantly more metal into the oil soluble product and also it has a clarifying effect on both the process mixture and the ultimate product.

The carbon dioxide treatment is conducted in such a manner as to reduce substantially the titratable basicity of the reaction mass. There are essentially two materials in the reaction mass prior to carbonation which are susceptible to reaction with carbon dioxide: the free basic metal compound (that which is in excess of the stoichiometric quantity required to form the normal metal salt) and the normal metal salt. It is possible that each of these materials reacts with the carbon dioxide simultaneously, but it is more likely that the excess basic metal compound is carbonated first and then the normal metal salt is carbonated last.

The products of this invention also can be prepared by mixing, at a temperature within the range of from about 20° C. to reflux temperature, a metal reactant and a hydrocarbon-substituted succinic acid or a mixture of said succinic acid and one of the above-described phosphorus acids. The hydrocarbon-substituted succinic acid can be replaced with the anhydride form thereof but if this is done it is necessary to incorporate water in an amount up to about 15% of the weight of the succinic compound. It is preferred to mix the acidic and metal compound for a sufficient period of time to complete the reaction, e.g., within the range of from about 2 to about 10 hours. After the mixing period, the mixture is dried at a temperature above about 100° C. and the residue is filtered.

The metal salts can also be prepared by a double decomposition reaction, e.g., a succinic acid can be reacted with a basic alkali metal compound and the resulting alkali metal succinate can then be reacted with a metal halide to give the desired metal succinate.

The use of a solvent such as toluene, mineral oil, higher alcohols, etc., is sometimes desirable. For example, isooctyl alcohol is useful in improving the solubility of metal salts.

The following examples are illustrative of the preparations of this invention:

Example 1

A polyisobutenyl succinic anhydride is prepared by the reaction of a chlorinated polyisobutylene (having an average chlorine content of 4.3 weight percent and an average of 82 carbon atoms) with maleic anhydride at about 200° C. The resulting polyisobutenyl succinic anhydride has an acid number of 90. To a mixture of 1,246 grams (1 equivalent) of this polyisobutenyl succinic anhydride and 1,000 grams of toluene, there is added, at 25° C., 76.6 grams (0.5 equivalent) of barium oxide. The mixture is heated to 115° C., at which temperature there is added dropwise 125 grams of water over a period of 1 hour. The mixture is allowed to reflux at 115° C. until all the barium oxide is reacted. The residue is dried and filtered. The resulting filtrate has a barium content of 4.71%.

Example 2

To a mixture of 500 grams (0.92 equivalent) of a polyisobutenyl succinic anhydride (having an acid number of 103 and prepared, as in Example 1, from maleic anhydride and chlorinated polyisobutylene having an average chlorine content of 4.3 weight percent and an average of 70.7 carbon atoms), and 300 grams of mineral oil, there is added, at 80° C., 50 grams of water. The mixture is agitated for 1 hour at 80° C. To the above mixture, there is added, at 80°–85° C., 153 grams (1.37 equivalents) of lead oxide over a 2 hour period. The mixture is maintained at a temperature of 100°–110° C. for 2.5 hours. The residue is dried and filtered. The resulting filtrate has a lead content of 13.6%, and a metal ratio of 1.4.

Example 3

To a mixture of 1,094 grams (2 equivalents) of a polyisobutenyl succinic anhydride (having an acid number of 102 and prepared, as in Example 1, from maleic anhydride and chlorinated polyisobutylene having an average chlorine content of 4.3 weight percent and an average of 71.4 carbon atoms), 762 grams of mineral oil, and 160 grams of water, there is added, at 60° C., 160 grams (2 equivalents) of sodium hydroxide. The addition is made portionwise over a 1-hour period. The mixture is maintained at a temperature of 92° C. for 2 hours. The residue is dried and filtered. The resulting filtrate has a sodium content of 1.44%.

Example 4

To a mixture of 1,096 grams (2 equivalents) of a polyisobutenyl succinic anhydride (having an acid number of 102 and prepared, as in Example 1, from maleic anhydride and chlorinated polyisobutylene having an average chlorine content of 4.3 weight percent and an average of 71.4 carbon atoms), 1,134 grams of mineral oil and 82 grams of water, there is added, at 60°–80° C. 82 grams (2.2 equivalents) of calcium hydroxide. The addition is made portionwise over a 1-hour period. The mixture is maintained at a temperature of 90°–100° C. for a period of 4 hours. The mixture is dried and filtered. The resulting filtrate has a calcium content of 1.67%.

Example 5

To a mixture of 1,096 grams (2 equivalents) of a polyisobutenyl succinic anhydride (having an acid number of 102 and prepared, as in Example 1, from maleic anhydride and chlorinated polyisobutylene having an average chlorine content of 4.3 weight percent and an average of 71.4 carbon atoms) and 1,182 grams of mineral oil, there is added, at 60°–80° C., 292 grams (2.2 equivalents) of strontium hydroxide octyl-hydrate. The addition is made portionwise over a 1 hour period. The mixture is maintained at a temperature of 90°–100° C. for 3 hours. The mixture is dried and filtered. The resulting filtrate has a strontium content of 2.95%.

Example 6

A nickel hydroxide solution is prepared by mixing, at 25° C., 89 grams (2.22 equivalents) of sodium hydroxide and 2,400 grams of water with 262 grams (2.2 equivalents) of nickel chloride hexahydrate. The precipitate, nickel hydroxide, is recovered. To a mixture of 1,110 grams (2 equivalents) of a polyisobutenyl succinic anhydride (having an acid number of 101 and prepared, as in Example 1, from maleic anhydride and chlorinated polyisobutylene having an average chlorine content of 4.3 percent weight and an average of 72 carbon atoms) and 1,167 grams of mineral oil, there is added, at 90°–100° C., the nickel hydroxide. The mixture is maintained at 90°–100° C. for 3 hours. The mixture is dried at 150° C. To the residue, there is added 94 grams of iso-octyl alcohol. The mixture is filtered. The resulting filtrate has a nickel content of 2.36%.

Example 7

To a mixture of 1,110 grams (2 equivalents) of a polyisobutenyl succinic anhydride (having an acid number of 101 and prepared, as in Example 1, from maleic anhydride and chlorinated polyisobutylene having an average chlorine content of 4.3 weight percent and an average of 72 carbon atoms), 1,222 grams of mineral oil and 141 grams of water, there is added, at 90° C., 141 grams (2.2 equivalents) of cadmium oxide. The mixture is maintained at a temperature of 90°–100° C. for 5 hours. The mixture is dried at 150° C. The residue is filtered. The resulting filtrate has a cadmium content of 3.97%.

Example 8

To a mixture of 714 grams (1.36 equivalents) of a polyisobutenyl succinic anhydride (having an acid number 107 and prepared, as in Example 1, from maleic anhydride and chlorinated polyisobutylene having an average chlorine content of 4.3 weight percent and an average of 67.7 carbon atoms) and 494 grams of mineral oil, there is added, at 80°–85° C., a solution containing 7.6 grams of water and 42.8 grams (0.65 equivalent) of potassium hydroxide. The addition is made portionwise over a 45-minute period. The mixture is then heated to 120° C. over a 3-hour period. The mixture is dried at 120° C./10 mm. The residue is filtered. The resulting filtrate has a potassium content of 1.98%.

Example 9

To a mixture of 714 grams (1.36 equivalents) of a polyisobutenyl succinic anhydride prepared as in Example 8, and 489 grams of mineral oil, there is added, at 80°–85° C., an aqueous solution of sodium hydroxide containing 26 grams (0.65 equivalent) of sodium hydroxide. The addition is made portionwise over a 30-minute period. The mixture is maintained at a temperature of 120° C. for 3 hours. The mixture is dried at 120° C./10 mm. The residue is filtered. The resulting filtrate has a sodium content of 1.18%.

Example 10

To a mixture of 714 grams (1.36 equivalents) of a polyisobutenyl succinic anhydride, prepared as in Example 8, and 480 grams of mineral oil, there is added, at 80°–85° C., an aqueous solution containing 27.3 grams (0.65 equivalent) of lithium hydroxide monohydrate. The addition is made portionwise over a 30-minute period. The mixture is maintained at a temperature of 120° C. for 3 hours. The mixture is dried at 120° C./10 mm. The residue is filtered. The resulting filtrate has a lithium content of 0.38 percent.

Example 11

To a mixture of 777 grams (1.5 equivalents) of a polyisobutenyl succinic anhydride (having an acid number of 108 and prepared, as in Example 1, from maleic anhydride and chlorinated polyisobutylene having an average chlorine content of 4.3 weight percent and an average of 67 carbon atoms), 538 grams of mineral oil and 50 grams of water, there is added, at 70°–85° C., 28 grams (0.75 equivalent) of calcium hydroxide. The addition is made portionwise over a 30 minute period. The mixture is maintained at a temperature of 90°–100° C. for 4 hours. Thereupon, the mixture is dried at 160° C. The residue is filtered. The resulting filtrate has a calcium content of 1.1%.

Example 12

To a mixture of 777 grams (1.5 equivalents) of a polyisobutenyl succinic anhydride, prepared as in Example 11, 586 grams of mineral oil and 100 grams of water, there is added, at 60° C., 128.6 grams (1.5 equivalents) of barium hydroxide. The mixture is maintained at a temperature of 95°–100° C. for 4.5 hours. The mixture is then dried at 150°–160° C. The residue is filtered. The resulting filtrate has a barium content of 5.35%.

Example 13

A polyisobutenyl succinic anhydride is prepared by the reaction of a polyisobutylene (having an average of 104 carbon atoms) with maleic anhydride at about 200° C. The resulting polyisobutenyl succinic anhydride has an acid number of 72. To a mixture of 718 grams (0.925 equivalent) of this polyisobutenyl succinic anhydride, 505 grams of mineral oil and 21 grams of water, there is added, at 80°–85° C., 19 grams (0.463 equivalent) of zinc oxide. The addition is made portionwise over a 15-minute period. The mixture is maintained at a temperature of 110°–150° C. for 2 hours. The mixture is dried at 150° C. The residue is filtered. The resulting filtrate has a zinc content of 1.22%.

Example 14

To a mixture of 4,662 grams (9 equivalents) of a polyisobutenyl succinic anhydride, prepared as in Example 11, 3,350 grams of mineral oil and 101 grams of water, there is added, at 30° C., 364 grams (9 equivalents) of zinc oxide. The mixture is maintained at a temperature of 105°–110° C. for 3 hours. Thereupon, 85 grams of iso-octyl alcohol and 200 grams of toluene are added to the mixture. The mixture is filtered. Nitrogen is bubbled through the filtrate for 3 hours at a temperature of 115°–125° C. The resulting filtrate has a zinc content of 3.35%.

Example 15

To a mixture of 278 grams (0.5 equivalent) of a polyisobutenyl succinic anhydride (having an acid number of 101 and prepared, as in Example 1, from maleic anhydride and chlorinated polyisobutylene having an average chlorine content of 4.3 weight percent and an average of 72 carbon atoms), 1,544 grams of mineral oil, 55 grams of water and 58 grams of heptylphenyl, there is added, at 70° C., 460 grams (6.01 equivalents) of barium oxide. The mixture is heated to 150° C. over 1.5 hours and is maintained at this temperature and blown with carbon dioxide until it is substantially neutral. The residue is dried and filtered. The resulting filtrate has a barium content of 14.5% and a metal ratio of 6.1.

Example 16

To a mixture of 1,110 grams (2 equivalents) of a polyisobutenyl succinic anhydride prepared as in Example 15, 1,250 grams of toluene and 275 grams of mineral oil, there is added, at 50° C., a solution containing 95 grams (2.37 equivalents) of sodium hydroxide and 100 grams of water. The mixture is maintained at 100° C. for 2 hours whereupon the mixture is dried. To the dry mixture, there is added a solution containing 143 grams (2.55 equivalents) of calcium chloride and 175 grams of water. The resulting mixture is maintained at a temperature of 100° C. for 2 hours. The mixture is dried and then treated with 278 grams of methanol and 126 grams (3.41 equivalents) of calcium hydroxide. The mixture is maintained at 50° C. and carbon dioxide is bubbled through until it is substantially neutral. Thereupon, the mixture is dried at 150° C. The residue is filtered. The resulting filtrate has a calcium content of 2.07% and a metal ratio of 1.8.

Example 17

To a mixture of 549 grams (1 equivalent) of a polyisobutenyl succinic anhydride (having an acid number of 102 and prepared, as in Example 1, from maleic anhydride and chlorinated polyisobutylene having an average chlorine content of 4.3 weight percent and an average of 71.4 carbon atoms), 509 grams of mineral oil, 60 grams of iso-octyl alcohol and 36 grams of water, there is added, at 70°–80° C., 223 grams (2 equivalents) of lead oxide. The addition is made portionwise over a period of 20 minutes. The mixture is maintained at a temperature of 98°–102° C. for 9 hours. The mixture is dried at 155° C./20 mm. The residue is filtered. The resulting filtrate has a lead content of 12.3% and a metal ratio of 1.4.

Example 18

To a mixture of 443 grams (1 equivalent) of a polyisobutenyl succinic anhydride (having an acid number of 126 and prepared, as in Example 1, from maleic anhydride and chlorinated polyisobutylene having an average chlorine content of 4.3 weight percent and an average of 56.3 carbon atoms), 450 grams of mineral oil and 20 grams of water, there is added, at 30° C., 22.5 grams (1.5 equivalents) of lithium oxide. The addition is made portionwise over a 30-minute period. The mixture is maintained at the temperature of 90°–100° C. for 4 hours. Thereupon the mixture is dried and filtered. The resulting filtrate has a lithium content of 1.32% and a metal ratio of 1.3.

Example 19

To a mixture of 700 grams (1 equivalent) of a polyisobutenyl succinic anhydride (having an acid number of 80 and prepared, as in Example 1, from maleic anhydride and chlorinated polyisobutylene having an average chlorine content of 4.3 weight percent and an average of 93 carbon atoms), 750 grams of mineral oil and 30 grams of water, there is added, at 90° C., 67.4 grams (0.5 equivalent) of tin monoxide. The addition is made portionwise over a 1-hour period. The mixture is maintained at a temperature of 90°–105° C. for 5 hours. The mixture is dried and filtered. The resulting filtrate has a tin content of 3.95%.

Example 20

To a mixture of 1,068 grams (2 equivalents) of a polyisobutenyl succinic anhydride (having an acid number of 105 and prepared, as in Example 1, from maleic anhydride and chlorinated polyisobutylene having an average chlorine content of 4.3 weight percent and an average of 69 carbon atoms), 1175 grams of mineral oil and 50 grams of water, there is added, at 90° C., 177 grams (2 equivalents) of cobalt propylate. The addition is made portionwise over a 1-hour period. The mixture is maintained at a temperature of 90°–105° C. for 3 hours. The mixture is dried at 150° C./10 mm. The residue is filtered. The resulting filtrate has a cobalt content of 2.52%.

Example 21

To a mixture of 1,068 grams (2 equivalents) of a polyisobutenyl succinic anhydride, described in Example 20, 1170 grams of mineral oil and 50 grams of water, there is added, at 80° C., 139 grams (3 equivalents) of nickel hydroxide. The addition is made portionwise over a 45-minute period. The mixture is maintained at a temperature of 95°–105° C. for 4 hours. The mixture is dried and filtered. The resulting filtrate has a nickel content of 3.38% and a metal ratio of 1.35.

Example 22

To a mixture of 816 grams (2 equivalents) of a polyisobutenyl succinic anhydride (having an acid number of 137 and prepared, as in Example 1, from maleic anhydride and chlorinated polyisobutylene having an average chlorine content of 4.3 weight percent and an average of 51.3 carbon atoms), 875 grams of mineral oil and 50 grams of water, there is added, at 50° C., 59.4 grams (1 equivalent) of nickel carbonate. The addition is made portionwise over a 30-minute period. The mixture is maintained at a temperature of 90°–100° C. for 6 hours. The residue is dried and filtered. The resulting filtrate has the nickel content of 1.7%.

Example 23

To a mixture of 4,144 grams (8 equivalents) of a polyisobutenyl succinic anhydride, described in Example 14, 2,972 grams of mineral oil and 90 grams of water, there is added, at 25° C., 324 grams (8 equivalents) of zinc oxide. The mixture is maintained at a temperature of 105°–110° C. for 3 hours. Thereupon, there is added at 100° C., 75 grams of iso-octyl alcohol and 200 grams of toluene. The mixture is filtered. The filtrate is heated to 120° C. and maintained at this temperature for 2 hours during which time nitrogen is bubbled through said filtrate. The resulting filtrate has a zinc content of 3.27%.

*Example 24*

To a mixture of 1,554 grams (3 equivalents) of a polyisobutenyl succinic anhydride (having an acid number of 108 and prepared, as in Example 1, from maleic anhydride and chlorinated polyisobutylene having an average chlorine content of 4.3 weight percent and an average of 67 carbon atoms), 1,581 grams of mineral oil and 30 grams of water, there is added, at 60° C., 219 grams (3.3 equivalents) of aluminum propylate. The mixture is maintained at a temperature of 90°–100° C. for 6 hours. Thereupon, the mixture is dried at 150° C./20 mm. To the residue, there is added 158 grams of iso-octyl alcohol. The residue is filtered. The resulting filtrate has an aluminum content of 0.80%.

*Example 25*

Di-chlorophenyl phosphinodithioic acid is prepared by mixing, at 140°–155° C. and in the presence of aluminum trichloride, 2,480 grams (22 equivalents) of chlorobenzene and 1,110 grams (5 equivalents) of phosphorus pentasulfide. The mixture is maintained at 140°–155° C. for 6 hours. The organic layer is rocovered and filtered. The resulting product is di-chlorophenyl phosphinodithioic acid. To 1,662 grams (3 equivalents) of a polyisobutylene succinic anhydride (having an acid number of 105 and prepared, as in Example 1, from maleic anhydride and chlorinated polyisobutylene having an average chlorine content of 4.3 weight percent and an average of 68 carbon atoms), 1,815 grams of mineral oil and 108 grams of water, there is added, at 90° C., 271 grams (6.6 equivalents) of zinc oxide. The mixture is maintained at 90° C. for 3 hours. To the above mixture there is added, at 95° C., 4,199 grams (2,7 equivalents) of the above di-chlorophenyl phosphinodithioic acid. The mixture is maintained at 95° C. for 3 hours. Thereupon, the mixture is dried at 100° C./20 mm. and the residue is filtered. The resulting filtrate has a zinc content of 3.4%.

*Example 26*

Dit(tetra-propylene-substituted phenyl) phosphorodithioic acid is prepared by mixing, at 25° C., 3,252 grams (12 equivalents) of tetra-propylene-substituted phenol and 666 grams (3 equivalents) of phosphorus pentasulfide. The mixture is maintained at 140° C. for 2.5 hours. Thereupon, the temperature is increased to 160° C. over 2.5 hours. The residue is filtered. The resulting product is di(tetra-propylene-substituted phenyl) phosphorodithioic acid. To 1,662 grams (3 equivalents) of a polyisobutylene succinic anhydride (having an acid number of 108 and prepared, as in Example 1, from maleic anhydride and chlorinated polyisobutylene having an average chlorine content of 4.3 weight percent and an average of 68 carbon atoms), 421 grams of mineral oil, 450 grams of toluene, and 135 grams of water, there is added, at 95° C., 258 grams (6.3 equivalents) of zinc oxide. The mixture is maintained at 95° C. for 1.5 hours. To the above mixture there is added, at 90° C., 1,908 grams (3 equivalents) of the above di(tetra-propylene-substituted phenyl) phosphorodithioic acid. The mixture is maintained at 95° C. for 3 hours. Thereupon, the mixture is dried at 130° C./20 mm. and the residue is filtered. The resulting filtrate has a zinc content of 5%.

*Example 27*

To a mixture of 1,098 grams (2 equivalents) of a polyisobutylene succinic anhydride (having an acid number of 102 and prepared, as in Example 1, from maleic anhydride and chlorinated polyisobutylene having an average chlorine content of 4.3 weight percent and an average of 71.4 carbon atoms), 300 grams of toluene, 215 grams of mineral oil, and 90 grams of water, there is added, at 95° C., 155 grams (4.2 equivalents) of calcium hydroxide. The mixture is maintained at 95° C. for 2 hours. To the above mixture, there is added, at 90° C., 746 grams (2 equivalents) of O,O-di(iso-octyl)-phosphorodithioic acid. The mixture is maintained at 95° C. for 2 hours. Thereupon, the mixture is dried at 120° C./20 mm. and the residue is filtered. The resulting filtrate has a calcium content of 4.4%.

*Example 28*

To a mixture of 1,108 grams (2 equivalents) of a polyisobutylene-substituted succinic anhydride (having an acid number of 108 and prepared, as in Example 1, from maleic anhydride and chlorinated polyisobutylene having an average chlorine content of 4.3 weight percent and an average of 67 carbon atoms), 300 grams of toluene, 184 grams of mineral oil, and 90 grams of water, there is added, at 95° C., 164 grams (4 equivalents) of zinc oxide. The mixture is maintained at 95° C. for 3 hours. To the above mixture there is added, at 85° C., 385 grams (1.8 equivalents) of di-isopropyl phosphoric acid. The mixture is maintained at 95° C. for 1 hour. Thereupon the mixture is dried at 120° C./20 mm. and the residue is filtered. The resulting filtrate has a zinc content of 3.0%.

When used as lubricating additives, the compositions of this invention are usually present in lubricating oils in amounts ranging from about 0.1% to about 20% by weight. The optimum percentage of said composition is governed by the character of service to which the lubricating composition is to be subjected. For example, lubricating compositions for use in gasoline internal combustion engines may contain from about 0.5% to about 5% by weight of the product of this invention. Where the use is for lubricating compositions in differential housings or diesel engines, the concentrations of said product may range as high as 20% or even more.

This invention contemplates also the use of other additives with the products of this invention in hydrocarbon compositions. Such additives include, for example, other detergents and dispersants of the ash-containing type, detergents and dispersants of the ashless-containing type, oxidation inhibiting agents, corrosion inhibiting agents, viscosity index improving agents, pour point depressing agents, extreme pressure agents, color stabilizers and anti-foam agents.

The ash-containing detergents and dispersants include oil-soluble neutral and basic salts of alkali metals, alkaline earth metals, magnesium, zinc, nickel, etc., and sulfonic acids, carboxylic acids and phosphorus acids. The basic salts can be prepared by mixing an acid with an excess of a basic metal neutralizing agent, a suitable promoter such as a phenolic compound, and a small amount of water, and carbonating the mixture at a temperature within the range of from about 50° C. to about 200° C. until the mixture is substantially neutral.

The ashless-containing detergents and dispersants include oil-soluble products obtained from the reaction of a hydrocarbon-substituted succinic anhydride and an alkylene polyamine. Boric acid may be reacted with a basic product of the above reaction to give an improved product. The hydrocarbon substituent can be of a polymer-type with a molecular weight within the range of from about 300 to about 100,000.

Extreme pressure agents and oxidation-inhibiting and corrosion-inhibiting agents are exemplified by chlorinated aliphatic hydrocarbons, organic sulfides and polysulfides, phosphorosulfurized hydrocarbons, phosphorus esters including dihydrocarbons and trihydrocarbon phosphites, metal thiocarbamates and metal phosphorodithioates.

Pour point depressing agents are illustrated by polymers of ethylene, propylene, isobutene, and poly(alkylmethacrylates). Anti-foam agents include polymeric alkyl siloxanes, poly(alkylmethacrylates), and the condensation products of alkylphenol with formaldehyde and an amine.

As stated previously, the products of this invention are useful as detergents and rust inhibitors. The above-mentioned additives can be used with the products of this invention to give a "packaged" product useful in mechanical apparatuses.

The products of this invention are also useful as emulsifying agents in water-in-oil emulsions. When used as such, the preferred concentration is within the range of from about 0.1% to about 10% by weight. It is contemplated that the products of the invention can also be used with other emulsion additives such as emulsion stabilizers (lecithin), rust inhibitors, dye additives, copper deactivating agents, etc.

To illustrate the utility of the compositions of this invention as additives in lubricating compositions, an oxidation and detergency test is run in which a 350 cc. lubricant sample consisting of a Mid-Continent, conventionally refined lubricating oil having a viscosity of 200 SUS/100° F. and 1.5% by weight of the additive to be tested is placed in a 2 x 15 (inches) borosilicate tube. A 1½ x 4½ (inches) SAE 1020 steel test panel (degreased in benzene and air-dried) is suspended partially immersed in the test solution. The sample is maintained at 300° F. for 96 hours during which time air is bubbled through said sample at a rate of 10 liters per hour. Thereupon, the sample is cooled to 122° F., mixed with 0.5% by volume of water, homogenized, allowed to stand at room temperature for 16 hours and then filtered through two layers of No. 1 Whatman filter paper at 20 mm. Hg pressure. The precipitate is washed with naphtha and desiccated to constant weight. The weight of the precipitate, adjusted to milligrams per 100 cc. of sample tested, is taken as a measure of the effectiveness of the detergent additive, i.e., the greater the weight of the precipitate the less effective the additive. The steel panels are color rated on a scale of 10–0 to indicate the degree of oxidation (10 being indicative of no rust and 0 being indicative of extremely heavy rusting). The results of the test are indicated in the following table (Table I):

TABLE I.—OXIDATION AND DETERGENCY TEST

| Additive | Sludge (mg. per 100 cc. of sample) | Panel Rating |
|---|---|---|
| None | 800–1,200 | 1 |
| Product of Example 3 | 6.7 | 9 |
| Product of Example 5 | 102 | 8 |
| Product of Example 9 | 6 | 8 |
| Product of Example 10 | 183 | 9 |
| Product of Example 14 | 3 | 9 |

To illustrate the thermal stability of the products of this invention, a "Panel Coker Test" is run. In this test, a 350-gram sample of the oil to be tested is placed in a coker reservoir which has therein a splash mechanism, both reservoir and sample being at ambient temperatures, and a 1½ inch x 3½ inch and ¼ inch thick aluminum panel, which has a sanded surface, is suspended above the oil in such a manner as to effect a hermetically sealed reservoir. The oil reservoir temperature and the panel temperature are maintained at 240°–255° F. and 580°–590° F., respectively, and the splash mechanism is operated for 13 minutes whereby the sample is splashed upon the sanded surface of the panel. Thereupon, the splash mechanism is turned off and the panel is allowed to bake for 2 minutes. The above cycle is repeated for a total of 4 hours at the end of which time the coker test mechanism is allowed to cool. The aluminum panel is then removed, washed with naphtha and inspected. The thermal stability of the oil sample being tested is measured by the panel inspection which is rated on a basis of the deposits which have accumulated on the aluminum panel. The results of the rating are indicated on a scale of 10–0 (10 being indicative of the complete absence of any such deposits and 0 being indicative of complete coverage of deposits on the panel). The following examples were tested to illustrate the thermal stability of the products of this invention, and the results are listed in Table II.

*Example A*

SAE 30 mineral lubricating oil containing 0.12% of phosphorus as a zinc salt of a phosphorodithioic acid obtained by the reaction of phosphorus pentasulfide with iso-octyl alcohol.

*Example B*

SAE 30 mineral lubricating oil containing 0.12% of phosphorus as the zinc salt of Example A and 9.0% of the product of Example 23.

*Example C*

SAE 30 mineral lubricating oil containing 0.12% of phosphorus as the zinc salt of Example A and 9.0% of the product of Example 8.

The results of the "Panel Coker Test" are indicated in the following table (Table II):

TABLE II.—PANEL COKER TEST

| Example tested: | Panel rating |
|---|---|
| A | 2 |
| B | 10 |
| C | 7.5 |

What is claimed is:

1. A metal salt of a hydrocarbon-substituted succinic acid having at least about 50 aliphatic carbon atoms in the hydrocarbon substituent, the metal of said metal salt being selected from the class consisting of Group I metals, Group II metals, aluminum, lead, tin, cobalt, and nickel.

2. The metal salt of claim 1 wherein the hydrocarbon substituent of the succinic acid is derived from an olefin polymer.

3. An acidic metal salt of an olefin-polymer substituted succinic acid wherein the olefin-polymer has a molecular weight within the range of from about 700 to about 100,000 and the metal of said metal salt is selected from the class consisting of Group I metals, Group II metals, aluminum, lead, tin, cobalt, and nickel.

4. A neutral metal salt of an olefin-polymer substituted succinic acid wherein the olefin-polymer has a molecular weight within the range of from about 700 to about 100,000 and the metal of said metal salt is selected from the class consisting of Group I metals, Group II metals, aluminum, lead, tin, cobalt, and nickel.

5. A basic metal salt of an olefin-polymer substituted succinic acid wherein the olefin-polymer has a molecular weight within the range of from about 700 to about 100,000 and the metal of said metal salt is selected from the class consisting of Group I metals, Group II metals, aluminum, lead, tin, cobalt, and nickel.

6. The basic metal salt of claim 5 wherein the metal is barium.

7. A lubricating composition comprising a major proportion of a lubricating oil and from about 0.1% to about 20% by weight of a metal salt of claim 1.

References Cited by the Examiner

UNITED STATES PATENTS

| | | | |
|---|---|---|---|
| 2,528,373 | 10/1950 | Knowles et al. | 252—35 |
| 2,868,729 | 1/1959 | Nelson et al. | 252—39 |
| 3,029,268 | 4/1962 | Goldsmith | 252—32.7 |
| 3,076,763 | 2/1963 | Nelson | 252—39 |
| 3,086,939 | 4/1963 | Tichelaar et al. | 252—32.7 X |
| 3,108,960 | 10/1963 | Le Suer | 252—32.7 |
| 3,163,603 | 12/1964 | Le Suer | 252—33.6 |
| 3,234,130 | 2/1966 | Nixon et al. | 252—39 |
| 3,234,131 | 2/1966 | Morway | 252—40.5 |

DANIEL E. WYMAN, *Primary Examiner.*

P. P. GARVIN, *Assistant Examiner.*